(12) United States Patent
Korenari

(10) Patent No.: US 6,201,651 B1
(45) Date of Patent: Mar. 13, 2001

(54) CIRCUIT FOR REPRODUCING DATA AND APPARATUS FOR READING DATA OUT OF A MAGNETIC DISC BASED ON CALCULATED FREQUENCY CUT OFF

(75) Inventor: Takahiro Korenari, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/227,863

(22) Filed: Jan. 11, 1999

(30) Foreign Application Priority Data

Jan. 13, 1998 (JP) .................................................. 10-004612

(51) Int. Cl.$^7$ ...................................................... G11B 5/02
(52) U.S. Cl. .................. 360/25; 360/55; 360/46; 360/65; 360/53
(58) Field of Search ................................. 360/55, 25, 46, 360/65, 53, 73.03

(56) References Cited

U.S. PATENT DOCUMENTS

| | | | |
|---|---|---|---|
| 5,834,969 | * 11/1998 | Umeyama et al. | ..................... 360/61 |
| 5,886,844 | * 3/1999 | Shimizu | ................................. 360/65 |
| 5,898,532 | * 4/1999 | Du et al. | ................................. 360/46 |
| 6,003,051 | * 12/1999 | Okazaki | ................................. 360/46 |

FOREIGN PATENT DOCUMENTS

| | | |
|---|---|---|
| 5-85060 | 11/1993 | (JP) . |
| 8-87707 | 4/1996 | (JP) . |
| 9-44810 | 2/1997 | (JP) . |
| 11-96510 | 4/1999 | (JP) . |

OTHER PUBLICATIONS

Abstract of Japanese Patent No. JP406259702A by Fujitsu, published Sep. 16, 1994.*

* cited by examiner

Primary Examiner—Alan T. Faber
(74) Attorney, Agent, or Firm—Young & Thompson

(57) ABSTRACT

An apparatus for reading data out of a magnetic disc includes a circuit for reproducing data, the circuit having a high-pass filter having a cut-off frequency which is a maximum in the range that a solitary reproduced wave is not distorted. The apparatus ensures that a reproduced wave can be obtained without occurrence of reproduction error.

1 Claim, 3 Drawing Sheets

CIRCUIT FOR REPRODUCING DATA AND APPARATUS FOR READING DATA OUT OF A MAGNETIC DISC BASED ON CALCULATED FREQUENCY CUT OFF

BACKGROUND OF THE INVENTION

1. Field of the Invention

The invention relates to a circuit for reproducing data, and an apparatus for reading data out of a magnetic disc, and more particularly to such a circuit and such an apparatus both of which is capable of solving a problem that there occurs reproduction error due to fluctuation in a reproduction voltage while data is being reproduced by means of a magneto-resistance effect type head.

2. Description of the Related Art

A magneto-resistance effect type head is mounted on an apparatus for magnetically reproducing data, as a reproduction head. A magneto-resistance effect type head operates under such a principle as mentioned below. If a magnetization orientation varies, an electrical resistance of a magneto-resistance effect element accomplishing electromagnetic conversion also varies. Hence, by keeping a constant sense current to run through the magneto-resistance effect element, variation in a magnetization orientation in the magneto-resistance effect element can be detected as variation in a voltage.

An electrical resistance of a magneto-resistance effect element also varies, if a temperature of the magneto-resistance effect element varies. That is, a voltage for reproducing data varies not only by variation in a magnetization orientation, but also by variation in a temperature of a magneto-resistance effect element.

A temperature of a magneto-resistance effect element varies, for instance, when there is generated frictional heat because of contact between a magnetic recording medium and a magneto-resistance effect element, or when frictional heat generated due to contact between a magnetic recording medium and parts other than a magneto-resistance effect element transfers to a magneto-resistance effect element.

If a temperature of a magneto-resistance effect element varies, a voltage for reproducing data varies, resulting in that signals other than signals transmitted from a magnetic recording medium and indicative of a magnetic field profile are reflected on a waveform of a reproduced wave, which would cause reproduction errors.

A voltage used when a magnetic field is not applied to a magneto-resistance effect element from a magnetic recording medium is referred to as a base line. Since no signals are received in a magneto-resistance effect element, a voltage for reproducing data is kept constant. However, if a temperature of a magneto-resistance effect element varies, a voltage for reproducing data also varies even in a magneto-resistance effect element receiving no signals, resulting in fluctuation in a base line.

When a base line varies due to such fluctuation in a temperature, there has been conventionally employed a high-pass filter to compensate for such distortion, because a frequency of fluctuation in a base line is small.

A high-pass filter having a cut-off frequency which is as high as possible in the range that the cut-off frequency is smaller than a minimum recording frequency could have greater effect for suppressing fluctuation in a base line.

However, a high-pass filter having an excessively high cut-off frequency would be accompanied with a problem. The first reason is that a higher cut-off frequency would cause a reproduced wave to be distorted to a greater degree. The second and main reason is that since a cut-off frequency at which a reproduced wave is much distorted is dependent on a rotational frequency of a magnetic recording medium, a rotation radius (track location) of a magnetic recording medium on which a magnetic head makes slide movement, and so on, a cut-off frequency cannot be defined in a single value.

An optimal cut-off frequency has been conventionally determined in trial and error. However, as mentioned earlier, if a cut-off frequency is to be determined in trial and error, a cut-off frequency has to be altered each time a rotational frequency or a rotation radius of a magnetic recording medium varies. In addition, a cut-off frequency has to be altered in dependence on a tendency of fluctuation in a base line.

As mentioned earlier, a cut-off frequency of a high-pass filter used for suppressing fluctuation in a base line cannot be defined into a single frequency, and it is impossible to suppress base line fluctuation having a frequency higher than a cut-off frequency.

Hence, it is desired that a cut-off frequency is set as high as possible. However, if a cut-off frequency is set higher than a minimum frequency of a component of a signal transmitted from a magnetic recording medium, a reproduced signal would be removed, and/or a reproduced wave might be distorted.

Japanese Unexamined Utility Model Publication No. 5-85060 has suggested a circuit for processing signals, including a magneto-resistance effect type element. The circuit further includes a high-pass filter for compensating for a temperature characteristic of the magneto-resistance effect type element.

However, the Publication does not refer to a cut-off frequency of the high-pass filter, and hence, does not mention a problem of fluctuation in a base line.

Japanese Unexamined Patent Publication No. 8-87707 has suggested an apparatus for magnetically recording and reproducing data. The apparatus is comprised of a circuit for generating a rectangular wave signal in accordance with magnetization inversion occurring on a magnetic recording medium, and a subtracter for subtracting the thus generated rectangular wave signal from a reproduced signal to thereby remove base line shift noise. According to the apparatus, it is possible to remove base line shift noise generated by MR head, and thereby, reproduce data without noise.

SUMMARY OF THE INVENTION

In view of the above-mentioned problems of the prior art, it is an object of the present invention to provide a circuit for reproducing data, and an apparatus for reading data out of and writing data into a magnetic disc, both of which are capable of suppressing fluctuation in base line, and hence, obtaining a reproduced wave without reproduction error.

In one aspect of the invention, there is provided a circuit for reproducing data, used for a magneto-resistance effect type head, including a high-pass filter having a maximum cut-off frequency in the range that a solitary reproduced wave is not distorted.

In another aspect of the invention, there is provided an apparatus for reading data out of a magnetic disc, including a circuit for reproducing data, the circuit including a high-pass filter having a maximum cut-off frequency in the range that a solitary reproduced wave is not distorted.

It is preferable that the apparatus further includes a magnetic recording medium having a raised portion and a recessed portion on a surface thereof, the raised and recessed portion being alternately formed, an interval between a raised portion and an adjacent raised portion being defined in such a manner that fluctuation in a base line is removed.

It is preferable that the magnetic recording medium rotates at such a rotational frequency that fluctuation in a base line of a reproduced wave is removed.

It is preferable that a cut-off frequency $f_1$ of the high-pass filter is designed smaller than a frequency $f_2$ which is a maximum in the range that a reproduced wave passing through the high-pass filter is not distorted ($f_1 < f_2$).

It is preferable that a relation among a cut-off frequency f1 of the high-pass filter in the unit of Hz, a relative peripheral speed V in the unit of meter per second between the magnetic recording medium and a magnetic head, and the interval in the unit of meter is defined as follows:

$$V/f_1 < T.$$

It is considered that fluctuation in a base line is concerned with a distance between a magnetic recording medium and an element for reproducing data, and fluctuation in such a distance is concerned with fluctuation in a temperature of a magneto-resistance effect element. Accordingly, it is presumed that an interval of fluctuation in the above-mentioned distance is concerned with an interval of fluctuation in a base line.

For instance, it would be possible to define an interval of fluctuation in a base line by defining an interval between a raised portion and a recessed portion formed on a surface of a magnetic recording medium in a contact recording system wherein data is recorded by means of a contact type magnetic head. A frequency of the base line fluctuation can be determined based on a relative speed between a magnetic recording medium and a reproduction head, and an interval of the base line fluctuation.

A cut-off frequency of the high-pass filter is set as high as possible unless a reproduced waveform is not distorted. The frequency of the base line fluctuation is set smaller than the cut-off frequency of the high-pass filter. As a result, it is possible to completely suppress the base line fluctuation.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 1:
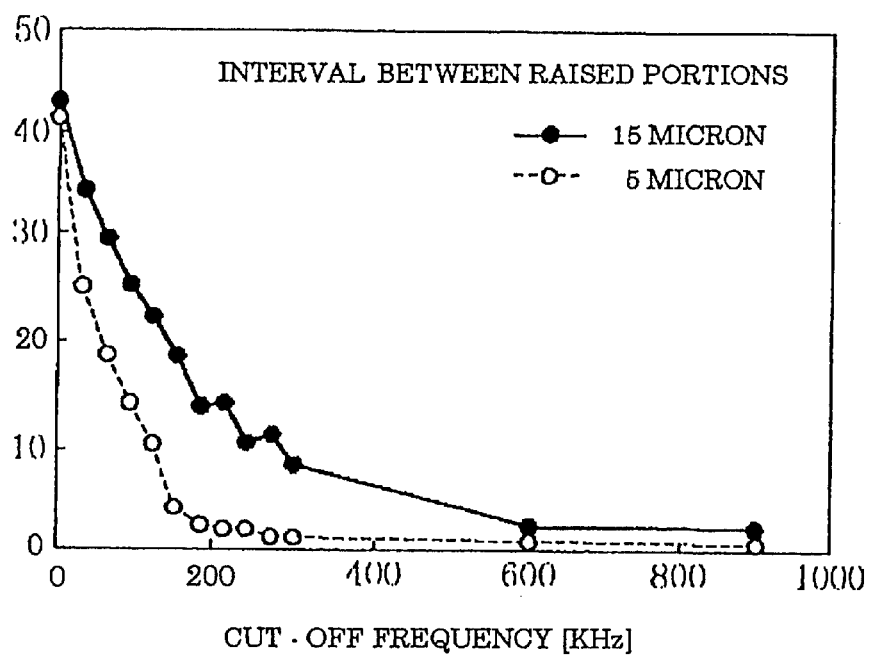
FIG. 1 is a graph illustrating a dependency of base line fluctuation on a cut-off frequency of a high-pass filter.

FIG. 1 is a graph illustrating a dependency of base line fluctuation on a cut-off frequency of a high-pass filter. FIGS. 2 to 5 show a dependency on a cut-off frequency, observed when a solitary reproduced wave in a low record density has passed through a high-pass filter. The reproduced waves illustrated in FIGS. 2 to 5 were obtained by causing a contact type magnetic head to make slide movement on a magnetic recording medium at a peripheral speed of 5 m/s, and reproducing data out of a record track having 5 kFRPI. The magnetic recording medium has a product (Br·δ), defined by multiplying a residual magnetic flux density by a magnetic film thickness, of 100 Gaussmicron.

Figure 2:
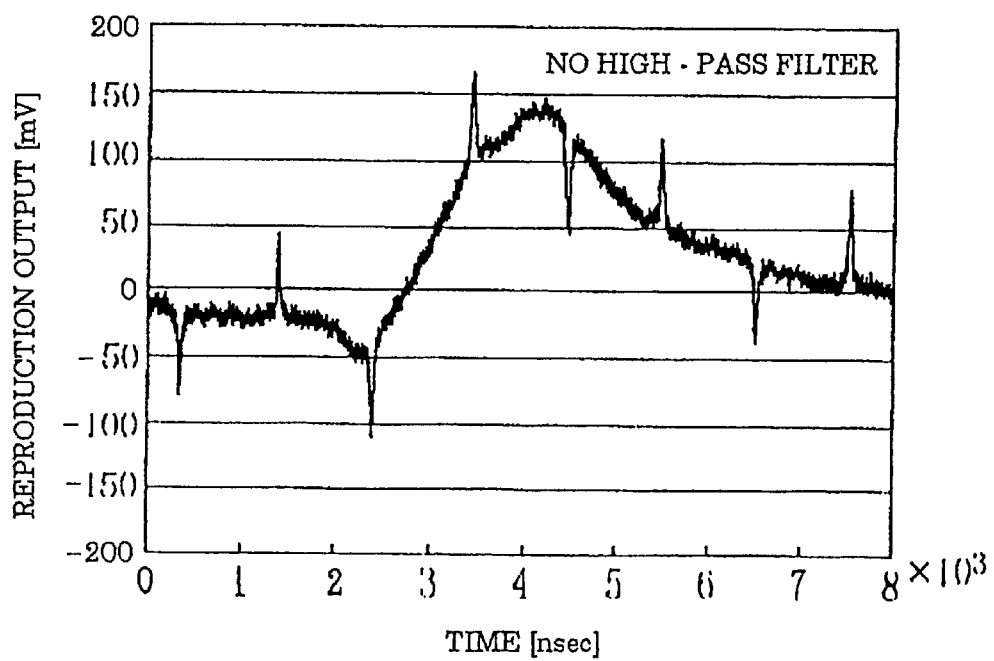
FIG. 2 illustrates a waveform of a solitary reproduced wave in a low record density, wherein the solitary reproduced wave does not pass through a high-pass filter.
Figure 3:
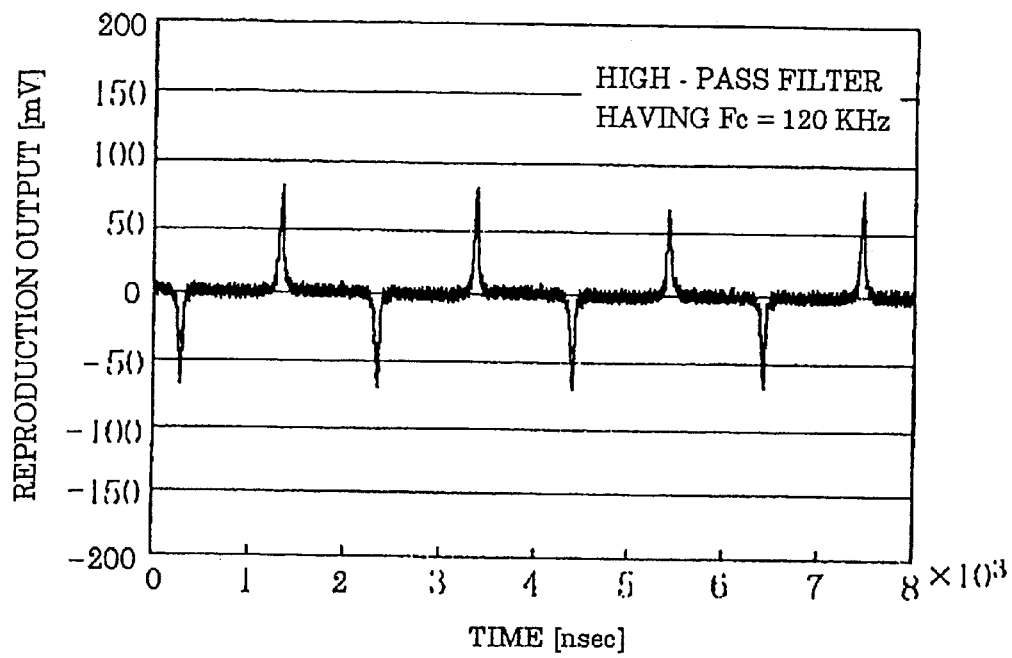
FIG. 3 illustrates a waveform of a solitary reproduced wave in a low record density, which wave have passed through a high-pass filter having a cut-off frequency Fc of 120 kHz.
Figure 4:
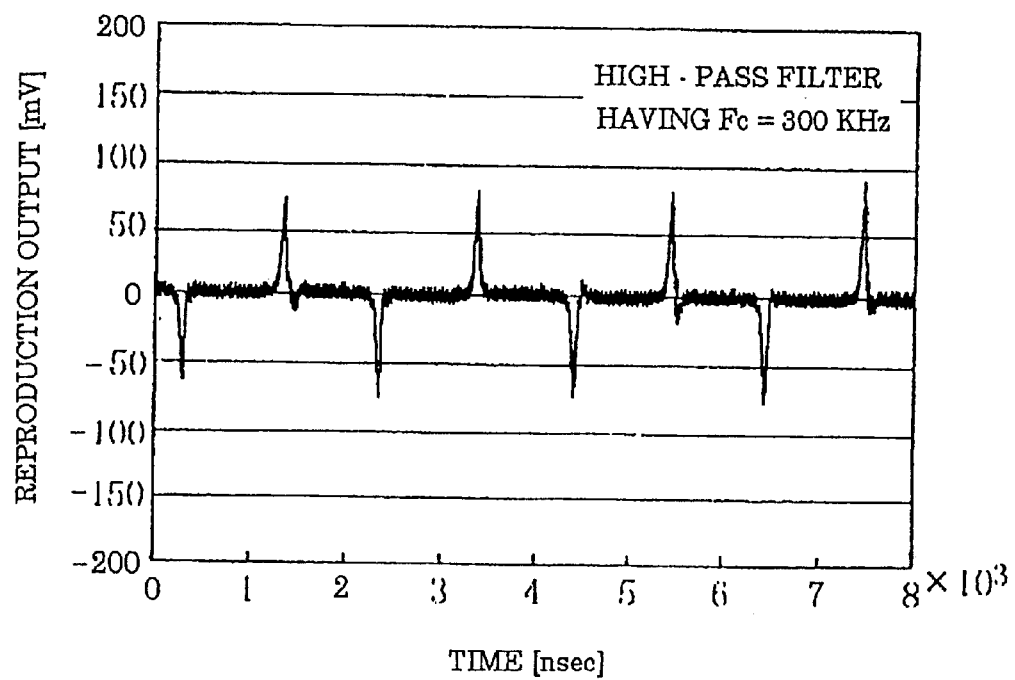
FIG. 4 illustrates a waveform of a solitary reproduced wave in a low record density, which wave have passed through a high-pass filter having a cut-off frequency Fc of 300 kHz.
Figure 5:
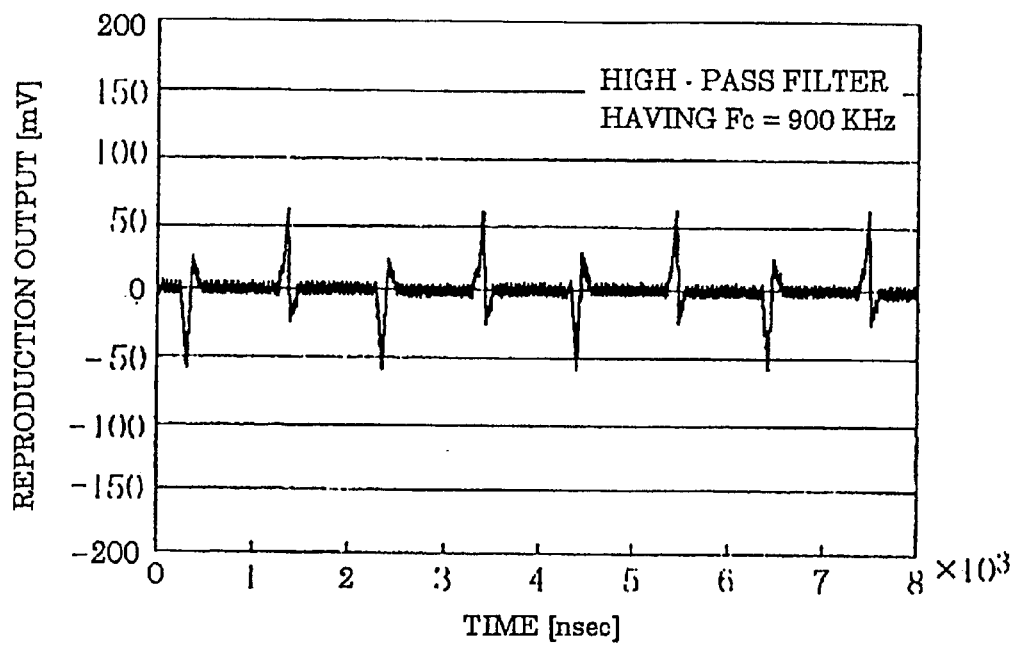
FIG. 5 illustrates a waveform of a solitary reproduced wave in a low record density, which wave have passed through a high-pass filter having a cut-off frequency Fc of 900 kHz.

In FIG. 2, there is not used a high-pass filter, and in FIGS. 3 to 5, there are used high-pass filters having a cut-off frequency Fc of 120 kHz, 300 kHz, and 900 kHz, respectively. As is obvious in view of FIGS. 3 to 5, a reproduced wave is distorted, if a high-pass filter has a cut-off frequency equal to or greater than about 300 kHz.

Figure 6:
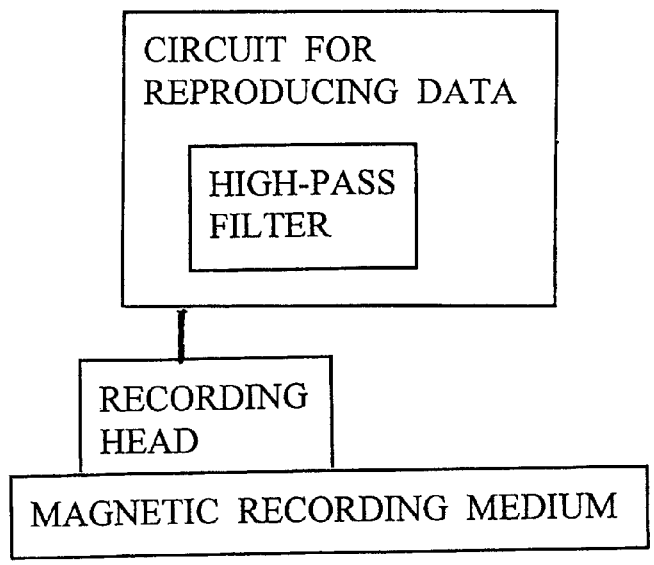
FIG. 6 is a schematic representation of the elements of the present invention.

Accordingly, a high-pass filter has to have a cut-off frequency Fc smaller than about 300 kHz under the above-mentioned condition. That is, it is necessary for a circuit to have an arrangement in which a cut-off frequency $f_1$, (Hz) of a high-pass filter is smaller than a frequency $f_2$ (Hz) which is a maximum in the range that a reproduced wave passing through the high-pass filter is not distorted ($f_1 < f_2$). The schematic relationship between the high-pass filter, recording head, and recording medium are illustrated in FIG. 6.

However, as is obvious in view of FIG. 1, if a high-pass filter is designed to have an excessively high cut-off frequency, it would be possible to reduce fluctuation in a base line. Herein, fluctuation in a base line (herein referred to as "base line fluctuation") is defined as a standard deviation of sampling values of a base line of reproduced waves.

In FIG. 1, data represented with solid circles indicate a dependency of the base line fluctuation on a cut-off frequency of a high-pass filter in the case that an interval between a raised portion and an adjacent raised portion formed on a surface of a magnetic recording medium is set to be equal to 15 micron. As is obvious in FIG. 1, it is impossible to completely remove the base line fluctuation at a cut-off frequency of 300 kHz which is a maximum frequency in the range that a reproduced wave is not distorted.

In FIG. 1, data represented with hollow circles indicate a dependency of the base line fluctuation on a cut-off frequency of a high-pass filter in the case that an interval between a raised portion and an adjacent raised portion formed on a surface of a magnetic recording medium is set to be equal to 5 micron. As is obvious in FIG. 1, it is possible to completely remove the base line fluctuation at a cut-off frequency of 300 kHz.

As is obvious in view of the above-mentioned description, it is possible to suppress the base line fluctuation by utilizing the dependency of the base line fluctuation on an interval between a raised portion and an adjacent raised portion formed on a surface of a magnetic recording medium.

To this end, a reproduced wave is first caused to pass through a high-pass filter having a maximum cut-off frequency in the range that the reproduced wave is not distorted. Then, a magnetic recording medium is designed to have such an interval between a raised portion and an adjacent raised portion formed on a surface thereof that the base line fluctuation could be completely removed at the above-mentioned cut-off frequency. Thus, it would be possible to obtain a reproduced wave without reproduction errors.

That is, it is necessary to define a relation among a cut-off frequency $f_1$ (Hz) of the high-pass filter, a relative peripheral speed V(m/s) between a magnetic recording medium and a magnetic head, and an interval T(m) between a raised portion and an adjacent raised portion formed on a surface of the magnetic recording medium, as follows:

$$V/f_1 < T.$$

As having been explained so far, the present invention provides an advantage that a reproduced wave can be obtained without reproduction errors by designing a high-pass filter to have a cut-off frequency which is a maximum frequency in the range that the reproduced wave is not distorted, and by defining such an interval between a raised portion and an adjacent raised portion formed on a surface of a magnetic recording medium that the base line fluctuation can be completely removed at the above-mentioned cut-off frequency.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. An apparatus for reading data out of a magnetic disc, comprising:

a magnetic head;

a circuit for reproducing data, said circuit including a high-pass filter having a cut-off frequency which is a maximum in the range that a solitary reproduced wave is not distorted; and a magnetic recording medium having raised portions and recessed portions on a surface thereof;

wherein the following relationship is established:

$V/f_1 < T$, where

V is a peripheral relative speed between the magnetic recording medium and the magnetic head in meters per second;

$f_1$ is a cut-off frequency of the high-pass filter in Hz; and

T is an interval between said raised portion and an adjacent said raised portion in meters.

* * * * *